United States Patent [19]

Smith

[11] Patent Number: 5,785,530
[45] Date of Patent: Jul. 28, 1998

[54] METHOD AND APPARATUS FOR VISUALLY DEPICTING IN THREE DIMENSIONS A HEALTH CARE TREATMENT REGIMEN FOR A GIVEN MEDICAL DIAGNOSIS

[75] Inventor: Joe Lowell Smith, Powell, Tenn.

[73] Assignee: DeRoyal Industries, Inc., Powell, Tenn.

[21] Appl. No.: 629,436

[22] Filed: Apr. 9, 1996

[51] Int. Cl.[6] .................. G09B 25/00; G09B 1/06
[52] U.S. Cl. .................. 434/219; 434/365; 434/403; 446/85
[58] Field of Search .................. 434/72, 74, 195, 434/208, 211, 219, 365, 403; 446/85, 108, 118, 128

[56] References Cited

U.S. PATENT DOCUMENTS

| | | |
|---|---|---|
| 124,078 | 2/1872 | Ostrander. |
| 1,305,724 | 6/1919 | Kennedy .................. 434/195 |
| 1,968,189 | 7/1934 | Bartels .................. 25/41 |
| 2,465,871 | 3/1949 | Hardie et al. .................. 72/17 |
| 3,231,646 | 1/1966 | Conder et al. .................. 264/86 |
| 3,414,986 | 12/1968 | Stassen .................. 434/195 |
| 3,602,476 | 8/1971 | Iragorri .................. 249/96 |
| 3,642,395 | 2/1972 | Dreher .................. 425/109 |
| 3,862,512 | 1/1975 | Vogel .................. 446/128 |
| 4,031,682 | 6/1977 | Renkert .................. 52/434 |
| 4,504,234 | 3/1985 | Jarvis .................. 434/188 |
| 4,650,437 | 3/1987 | Sitkus .................. 446/128 |
| 5,009,387 | 4/1991 | Scott et al. .................. 249/96 |
| 5,061,218 | 10/1991 | Garage et al. .................. 446/102 |
| 5,137,452 | 8/1992 | Pollock .................. 434/195 |
| 5,152,937 | 10/1992 | Tetu .................. 264/24 |
| 5,250,000 | 10/1993 | Boutin et al. .................. 446/75 |
| 5,268,137 | 12/1993 | Scott et al. .................. 264/225 |
| 5,368,486 | 11/1994 | Kurzman .................. 434/79 |

*Primary Examiner*—Robert A. Hafer
*Assistant Examiner*—Laura Fossum
*Attorney, Agent, or Firm*—Paul E. Hodges, P.C.

[57] ABSTRACT

Method and apparatus for visually depicting a health care treatment regimen for a given medical diagnosis including a substantially flat planar platform and a plurality of groupings of geometric members which are representative of various events which go to make up the treatment regimen. The geometric members of a particular grouping preferably are equally sized and of a coloring that is unique to the grouping. All geometric members are releasably securable to the platform and/or one another to permit their securement to the platform and/or to one another in positions denoting the existence of, position of and order of occurrence of their represented events within the treatment regimen.

10 Claims, 2 Drawing Sheets

METHOD AND APPARATUS FOR VISUALLY DEPICTING IN THREE DIMENSIONS A HEALTH CARE TREATMENT REGIMEN FOR A GIVEN MEDICAL DIAGNOSIS

FIELD OF INVENTION

This invention relates to methods and apparatus for depicting visually, in three dimensions, a health care treatment regimen for a given medical diagnosis.

BACKGROUND OF INVENTION

Heretofore, it has been common in health care facilities to administer health care on a cost reimbursement basis. Under this system, each department or unit of the health care facility was made aware of the patient population and each department made its own arrangements for accommodating this patient population. In the end, the cost incurred within each of the various departments were, in general, grouped together and allocated over the patient population. This method has been attacked by private payors and third party payors as resulting in unacceptable cost for the provision of health care. As a consequence, there has been, and is ongoing, examination of the methods employed in the administration of health care, particularly at the level of a health care facility, such as a hospital.

A relatively recent method for administration of the care of a patient in a health care facility employs the concept of compiling a listing of the care events, care activities, and resources to be applied as a treatment regiment for a given medical diagnosis, and distribution of this listing to the various departments or units within the health care facility to alert these departments or units of their respective responsibilities with respect to a given patient admitted to the health care facility for treatment for the given medical diagnosis. A listing associated with this method is commonly referred to as a "clinical pathway". Some clinical pathways are relatively detailed as to the responsibilities of the various departments or units within the health care facility, as well as the resources which are to be brought to bear over the course of the patient's stay in the health care facility for implementation of the treatment regimen set forth in the clinical pathway.

These clinical pathways, and the basic concepts behind them, require considerable instruction and training of health care personnel that are to be using the clinical pathways in the day-to-day performance of their duties. Accordingly, there is a need for training methods or aids which provide assistance in the instruction and training of health care personnel in connection with the concepts associated with clinical pathways.

It is therefore an object of the present invention to provide a method for depicting visually, in three dimension, a health care treatment regimen for a given medical diagnosis.

It is another object to provide a visual, three dimension, model of a clinical pathway, which model comprises individual members which are representative of events of the clinical pathway and which are suitable for being joined in a manner that results in a visual, three dimension, model of the clinical pathway.

Other objects and advantages of the present invention will be recognized by one skilled in the art in view of the present description, including the claims and the drawings, in which, FIG. 1 is a pictorial representation of a model of a clinical pathway; and FIGS. 2A, 2B and 2C depict an exploded view of the model depicted in FIG. 1.

SUMMARY OF INVENTION

In accordance with one aspect of the method of the present invention, there is provided a substantially planar platform having top and bottom surfaces and which is representative of the given medical diagnosis addressed by a given clinical pathway. One or more first geometric members, each also having top and bottom surfaces, are provided, each of which is representative of a care event (e.g. patient admission) associated with the given medical diagnosis. These first geometric members are secured, at their bottom surfaces, to the top surface of the platform in an array which identifies the order of implementation of the care events associated with the given medical diagnosis. Further, one or more second geometric members, each having top and bottom surfaces, are provided. Each of these second geometric members is representative of a care activity (e.g. anesthesia) associated with a care event. These second geometric members are secured, at their bottom surfaces, to the top surfaces of respective ones of the first geometric members that are representative of the care events. Still further, one or more third geometric members, each having a top and bottom surface, are provided, each of which is representative of a resource bundle, (e.g. a grouping of disposable supplies) that is to be brought to bear in the implementation of a care event or care activity. These third geometric members are secured, at their bottom surfaces, to the top surfaces of a respective ones of the first or second geometric members with which the resource is associated in the treatment regimen. Fourth, fifth, etc. geometric members may be provided to represent other events or special resources associated with the treatment regimen, e.g. data events, human resources, instrumentation, and/or other events or special resources. In a preferred method, each of the groupings (i.e. first, second, third, etc.) of geometric members is provided with identical coloring for the members of the grouping and the coloring of each grouping is unique to that grouping. In this manner, there is provided visual identity to the members of a grouping. Further, preferably, all the members of a grouping are of identical geometry and size to further enhance the visual identity of a member of a grouping, as well as the identity of a member of a grouping, as well as the identity of the grouping to which each member belongs. Still further, in accordance with a preferred aspect of the present invention, the footprint of each of the first geometric members is larger than the footprint of each of the second geometric members, the footprint of each of the second geometric members is larger than the footprint of the third geometric members, and so on with the fourth, fifth, etc. groupings of geometric members, thereby permitting the stacking of members of a higher membered grouping. Preferably, the footprint of the members of each grouping is such as permits the securement of a plurality of the member of a given grouping, to the top surface of a member of a lower membered grouping.

The result is a visual depiction of the clinical pathway, including the order of implementation of the care events, care activities and the resources which are to be brought to bear in the implementation of the treatment regimen for the given medical diagnosis.

The apparatus of the present invention, in one embodiment, comprises a substantially flat platform having top and bottom surfaces and which is representative of the given medical diagnosis addressed by a given clinical pathway, at least one first geometric member having top and bottom surfaces and which is representative of each of a care event associated with the given medical diagnosis, means for securing ones of the first geometric members, at their bottom surfaces, to the top surface of the platform in an array which identifies the order of implementation of the care events associated with the given medical diagnosis, at least one second geometric member having top and bottom surfaces, and which is representative of a care activity associated with a care event, means for securing the second geometric member to a respective one of the first geometric members with the bottom surface of the second geometric member facing the top surface of its respective one of the first geometric members, and, at least one third geometric member having top and bottom surfaces, and which is representative of a resource associated with a care event, a care activity, or another resource, and means for securing the third geometric member to a first or second geometric member with the bottom surface of the third geometric member facing that geometric member to which it is secured.

Preferably, the means for securing the first geometric members to the platform and the means for securing the second geometric members to the first geometric members, etc., provides for supply objects releasable securement of each geometric member to every other geometric member, including the platform. Further, additional events of the clinical pathway, such as human resource objects, etc. associated with the implementation of the clinical pathway may be represented by fourth geometric members having top and bottom surfaces and which may be secured at their bottom surfaces to the top surfaces of the first, second or third geometric members and/or to the platform. Still further fifth, and more geometric members may be provided which each represent some event or resource associated with the clinical pathway and which may be secured in like manner to one or more of the first, second, third, etc. geometric members or the platform with their respective top and bottom surfaces facing. In a preferred embodiment, any geometric member may be releasably secured to any other geometric member, or to the platform, thereby providing for universality of securement of the geometric members to one another and/or to the platform. In a preferred embodiment, the first geometric members are of the same geometry and size, the second geometric members are of the same geometry and size and smaller than the first geometric members, the third geometric members are of the same geometry and size and smaller than the second geometric members, but not necessarily smaller than the second geometric members. Any fourth and fifth geometric members may be shaped and sized in a similar manner. In accordance with another aspect of the invention, the platform is of a first color, the first geometric members are of a second color, the second geometric members are of a third color, the third geometric members are of a fourth color, the fourth geometric members are of a fifth color, etc. In one embodiment, each geometric member is labeled as to its representative event or resource associated with the clinical pathway. Additionally, each of the geometric members preferably is rectangular in profile and in cross section.

DETAILED DESCRIPTION OF INVENTION

Figure 1:
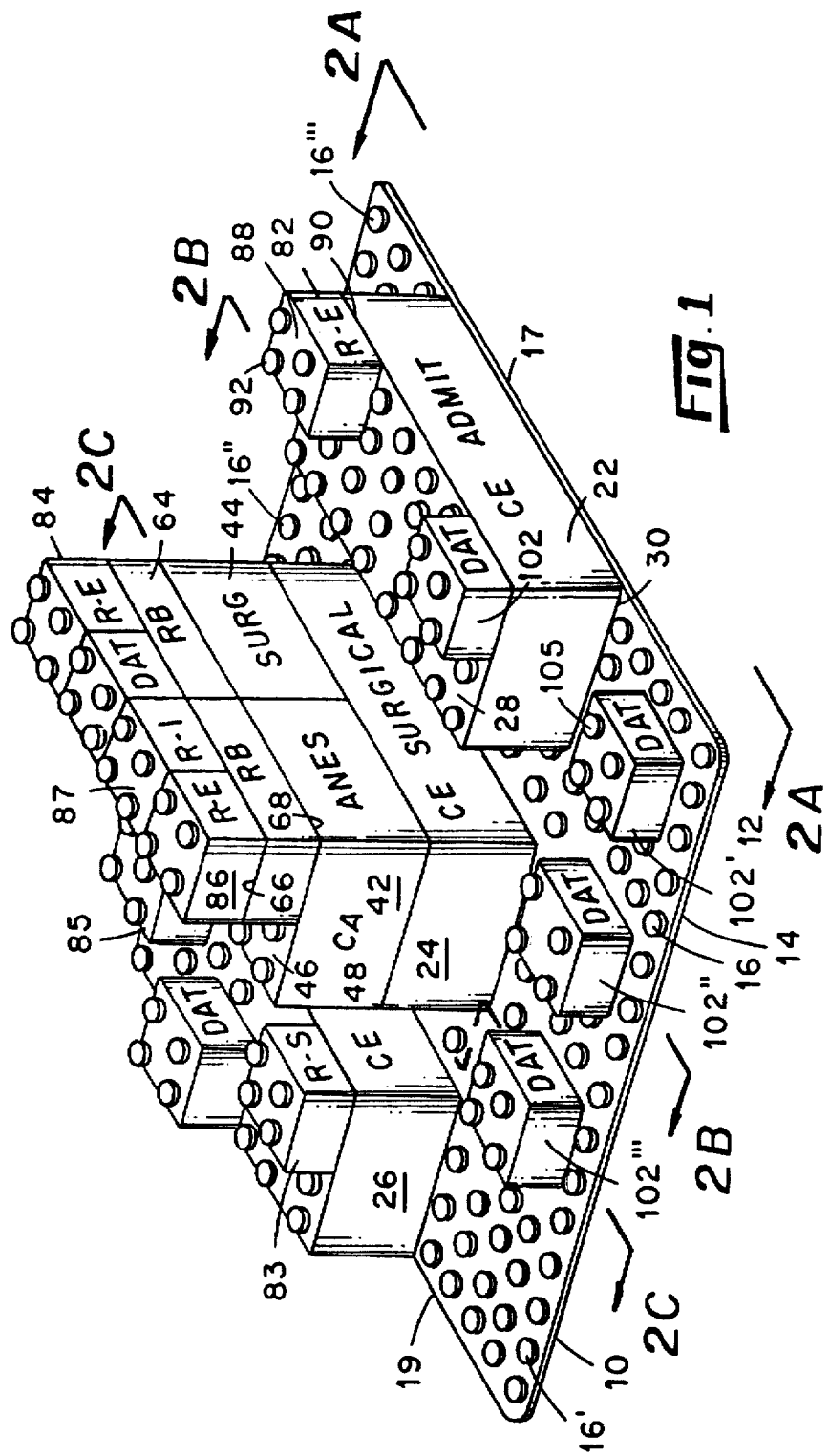
Figure 2A:
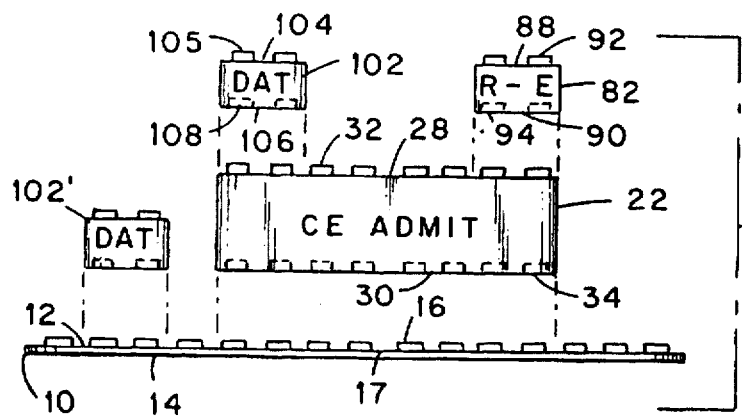
Figure 2B:
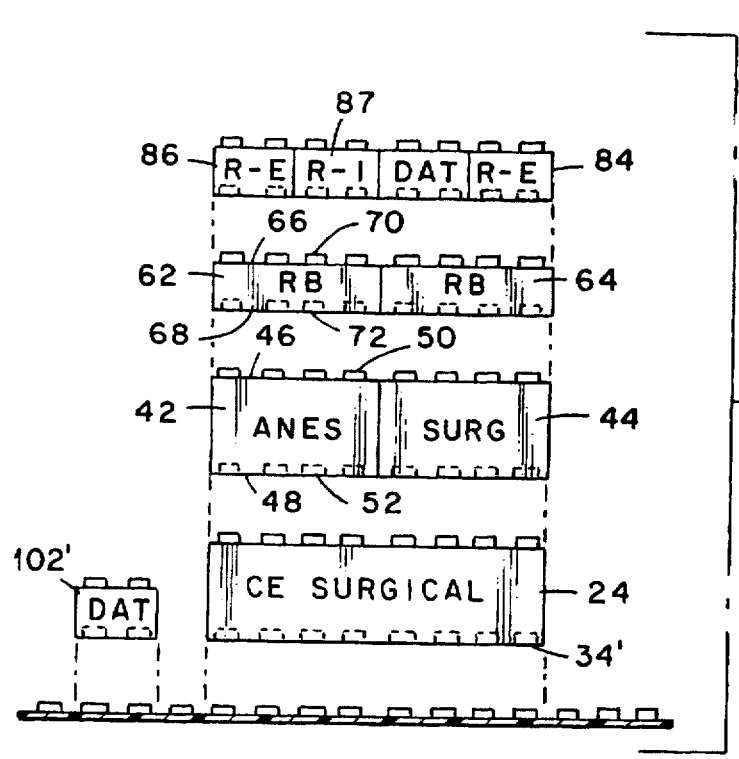
Figure 2C:
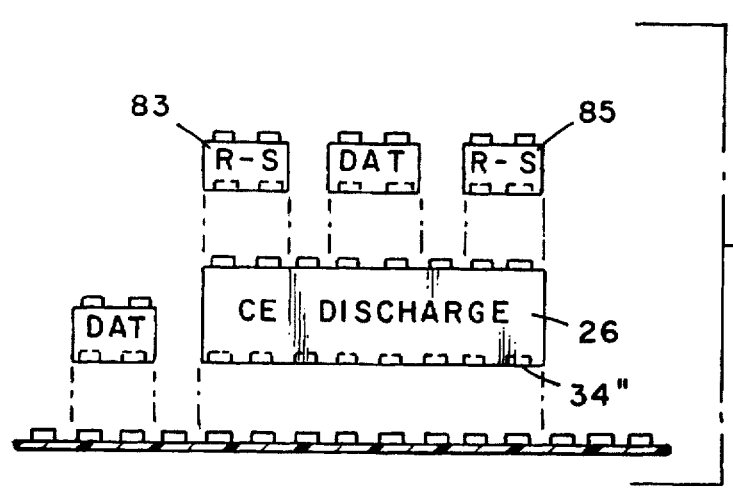

In FIGS. 1 and 2 there is depicted a physical representation of a model of a treatment regimen for a given medical diagnosis. In the depicted model there is provided a substantially flat planar platform 10 which is representative of the given medical diagnosis. The depicted platform includes substantially planar and parallel top and bottom surfaces 12 and 14, respectively. The top surface 12 includes a plurality of uniformly sized upstanding posts 16 (typical) that are spaced apart in equally spaced apart rows (In the Figures, multiples of a given element are at times designated with prime numbers, e.g. 16', 16", 16"', etc.) In accordance with one aspect of the present invention, the front edge 17 of the platform represents the commencement of a treatment regimen and the rear edge 19 of the platform represents the completion of the treatment regimen. Preferably the platform is of a first coloring.

The depicted model further includes a plurality of first geometric members 22, 24 and 26, each of which is representative of a care event that is associated with the treatment regimen for the given medical diagnosis. For example, the geometric member 22 is representative of the patient admission care event and is labeled CE ADMIT in the Figures. In like manner, the geometric member 24 is representative of a surgical care event associated with the treatment regimen and is labeled CE SURGICAL, and the geometric member 26 is representative of the patient discharge care event and is labeled CE DISCHARGE. Each of the geometric members 22, 24 and 26 includes a substantially flat planar top and bottom surface, such as the top and bottom surfaces 28 and 30, respectively, of the geometric member 22, for example. The top surface 28 of each of the first geometric members includes a plurality of uniformly spaced apart upstanding posts 32 which, preferably are identical to the posts 16 provided on the top surface of the platform 10 and spaced apart by distances equal to the spacing of the posts 16. The bottom surface of each of the first geometric members 22, 24 and 26 is provided with a plurality of bores 34 (typical), each of which is suitable frictional for receipt therein a post 16 of the platform 10 to thereby releasably secure the first geometric member 22 in place on the platform 10 with the bottom surface of the first geometric member facing the top surface of the platform. In accordance with one aspect of a preferred embodiment of the present invention, each of the first geometric members is of the same geometric shape and size and each is provided with a second coloring, all the first geometric members being of the same coloring. Preferably each of the first geometric members is of a rectangular block geometry, having a rectangular profile and rectangular cross-section. The size of each of the first geometric members is selected to provide a footprint thereof which permits the securement of a plurality of the first geometric members on the top surface of the platform, with at least a small spacing between adjacent ones of the first geometric members. In accordance with the present invention, the first geometric members 22, 24 and 26 are secured to the platform in an array which represents the sequence in which the care event is to occur in the treatment regimen. For example, in the depicted model, the geometric member 22 representing the patient admission care event is secured nearest the front edge 17 of the platform. Then in sequence from front edge to rear edge the geometric members 24 and 26 are secured to the platform, denoting that the surgical care event follows the patient admission care event and that the discharge event, located nearest the rear edge 19 of the platform, follows all other care events.

In the depicted model there is provided a plurality of second geometric members 42 and 44, each of which is representative of a care activity associated with a care event of the treatment regimen. For example, in FIGS. 1 and 2 the geometric member 42 is representative of an anesthesia care activity and is labeled CA ANES. The geometric member 44 is representative of a surgical care activity and is labeled SURG in the Figures. Each of the geometric members 42 and 44 includes a substantially flat planar top and bottom surface, such as the top and bottom surfaces 46 and 48, respectively, of the geometric member 42, for example. The top surface 46 of each of the second geometric members includes a plurality of uniformly spaced apart upstanding posts 50 which, preferably are identical to the posts 16 provided on the top surface of the platform 10 and spaced apart by distances equal to the spacing of the posts 16, hence identical in size and spacing as the posts 32 on the top surfaces of the first geometric members. The bottom surface of each of the second geometric members 42 and 44 is provided with a plurality of bores 52 (typical), each of which is suitable for frictional receipt therein a post 32 of a first geometric member to thereby releasably secure the second geometric member 22 in place on the top surface of a first geometric member with the bottom surface of the second geometric member facing the top surface of the first geometric member. In accordance with one aspect of a preferred embodiment of the present invention, each of the second geometric members is of the same geometric shape and size and each of the second geometric members is provided with a like third coloring. Preferably each of the second geometric members is of a rectangular block geometry, having a rectangular profile and rectangular cross-section. The size of each of the second geometric members is selected to provide a footprint thereof which permits the securement of a plurality of the second geometric members on the top surface of a first geometric member. In accordance with the present invention, the second geometric members 42 and 44 are secured to that one of the first geometric members with which the care activity is associated in the treatment regimen. For example, in the depicted model, the geometric members 42 and 44 representing the ANES and SURG care activities are secured to the first geometric member 24 denoting that these care activities are associated with the surgical care event, are to be prepared for in advance of the surgical care event, are to be carried out in the course of the surgical event.

As depicted in FIGS. 1 and 2, there is provided a plurality of third geometric members 62 and 64 which are representative of supply resource bundles labeled RB in the Figures. A supply resource bundle includes a plurality of supplies that are required for implementation of a care activity or a care event, for example. Each of the third geometric members 62 and 64 includes a substantially flat planar top and bottom surface, such as the top and bottom surfaces 66 and 68, respectively, of the third geometric member 62, for example. The top surface 66 of each of the third geometric members includes a plurality of uniformly spaced apart upstanding posts 70 which, preferably are identical to the posts 16 provided on the top surface of the platform 10 and spaced apart by distances equal to the spacing of the posts 16, hence identical in size and spacing as the posts 32 on the top surfaces of the first geometric members. The bottom surface of each of the second geometric members 62 and 64 is provided with a plurality of bores 72 (typical), each of which is suitable for frictional receipt therein of a post 50 of a second geometric member to thereby releasably secure the third geometric member 62 in place on the top surface of either a first or second geometric member with the bottom surface of the third geometric member facing the top surface of that geometric member to which the third geometric member is secured. In accordance with one aspect of a preferred embodiment of the present invention, each of the third geometric members is of the same geometric shape and size and each of the third geometric members is provided with a like fourth coloring. Preferably each of the third geometric members is of a rectangular block geometry, having a rectangular profile and rectangular cross-section.

The size of each of the third geometric members is selected to provide a footprint thereof which permits the securement of a plurality of the third geometric members on the top surface of a second geometric member. In accordance with the present invention, the third geometric members 62 and 64 are secured to that one of the second geometric members with which the surgical bundle is associated in the treatment regimen. For example, in the depicted model, the geometric members 62 and 64 representing supply bundles are secured to the second geometric members 42 and 44, respectively, denoting that these supply bundles are associated with the ANES and SURG care activities which, in turn are associated with the CE SURGICAL care event and are to be prepared for in advance of the surgical care event and are to be utilized in the course of the surgical care event.

Referring still to FIGS. 1 and 2, in the depicted model there is provided a plurality of fourth geometric members 82, 83, 84, 85, 86, and 87 each of which is representative of a resource which is brought to bear in the course of implementation of the depicted treatment regimen. In the Figures, these fourth geometric members are labeled variously to indicate the actual resource involved. For example, general supplies 83 and 85 may be labeled R-S. A human resource 82, 84, 86 may be labeled R-E. An instrument resource 87 may be labeled R-I. Each of the fourth geometric members, 82 being typical includes a substantially flat planar top and bottom surface, such as the top and bottom surfaces 88 and 90, respectively, of the fourth geometric member 82, for example. The top surface 88 of each of the fourth geometric members includes a plurality of uniformly spaced apart upstanding posts 92 which, preferably are identical to the posts 16 provided on the top surface of the platform 10 and spaced apart by distances equal to the spacing of the posts 16, hence identical in size and spacing as the posts on the top surfaces of the first, second and third geometric members. The bottom surface of each of the fourth geometric members 82, 84 and 86 is provided with a plurality of bores 94 (typical), each of which is suitable for receipt therein of a post of a second or third geometric member to thereby releasably secure the fourth geometric member in place on the top surface of either a first, second or third geometric member with the bottom surface of the fourth geometric member facing the top surface of that geometric member to which the fourth geometric member is secured. In accordance with one aspect of a preferred embodiment of the present invention, each of the fourth geometric members is of the same geometric shape and size and each of the fourth geometric members is provided with a like fifth coloring. The labeling is employed to differentiate different resources, if desired. Preferably each of the fourth geometric members is of a rectangular block geometry, having a rectangular profile and rectangular cross-section. The size of each of the fourth geometric members is selected to provide a footprint thereof which permits the securement of a plurality of the fourth geometric members on the top surface of a first, second or third geometric member. In accordance with the present invention, the fourth geometric members 82,83,84, 86 and 87 are secured to that one of the first, second or third geometric members with which the human resource is associated in the treatment regimen. For example, in the depicted model, the geometric member 82 representing a human resource is secured to the first geometric member 12, denoting that this human resource is associated with the patient admission care event and is to be available for performing their duties in the course of admission of the patient to the health care facility. By way of example, this human resource may be a public relations person whose duty is to explain to the patient the procedures which will be followed by the health care facility in treating the patient. In like manner, the fourth geometric members 84 and 86, representing an anesthesiologist and a surgeon, respectively, are associated with the ANES and the SURG care activities of the CE SURGICAL care event and are to be scheduled in advance of the surcigal care event and are to be present to perform their respective duties in the course of the surgical care event.

In the course of implementation of a treatment regimen for a given medical diagnosis, it is customary to gather and record copious data. The activity of gathering and recording the data may take place at any location and/or level of the treatment regimen for a given medical diagnosis. Accordingly, in the depicted model, there is provided a plurality of fifth geometric members 102 (typical), each of which is representative of a data event within the treatment regimen. Each of the geometric members 102 includes a substantially flat planar top and bottom surface, such as the top and bottom surfaces 104 and 106, respectively, of the member 102, for example. The top surface 104 of each of the fifth geometric members includes a plurality of uniformly spaced apart upstanding posts 105 (typical) which, preferably are identical to the posts 16 provided on the top surface of the platform 10 and spaced apart by distances equal to the spacing of the posts 16, hence identical in size and spacing as the posts on the top surfaces of the first, second, third and fourth geometric members. The bottom surface of each of the fifth geometric members 102 is provided with a plurality of bores 108 (typical), each of which is suitable for receipt therein of a post of the platform, or of a first, second, third or fourth geometric member to thereby releasably secure the fifth geometric member in place on the top surface of either of the platform, or a first, second, third or fourth geometric member with the bottom surface of the fifth geometric member facing the top surface of the platform or of that geometric member to which the fifth geometric member is secured. In accordance with one aspect of a preferred embodiment of the present invention, each of the fifth geometric members is of the same geometric shape and size and each of the fifth geometric members is provided with a like sixth coloring. Preferably each of the fifth geometric members is of a rectangular block geometry, having a rectangular profile and rectangular cross-section. The size of each of the fifth geometric members is selected to provide a footprint thereof which permits the securement of a plurality of the fifth geometric members on the top surface of a first, second, or third geometric member. In accordance with the present invention, the fifth geometric members 102 are secured to the platform or to that one of the first, second, third or fourth geometric members with which the data event is associated in the treatment regimen. For example, in the depicted model, the fifth geometric member 102 representing the gathering and recording of data in the course of the admission of a patient to the health care facility is secured to the first geometric member 22, denoting that this data event is associated with the patient admission care event and is to be performed in the course of admission of the patient to the health care facility. By way of example, this data event may include obtaining and entering personal identification and medical history of patient. In like manner, other fifth geometric members, representing other data gathering and data recording events may be associated with the CE SURGICAL care event and/or the discharge care event may be provided, denoting the occurrence of a data event which is to be scheduled in advance of the care event and to be carried out in the course of the care event. Further, additional data events may be associated with the platform, denoting that these data events are global with respect to the treatment regimen represented by the platform, and therefore further fifth geometric members 102 may be secured to the platform itself.

Given the present disclosure, a person skilled in the art will recognize that other geometric members may be devised and employed in developing other and different events to be associated with a given treatment regimen for a given medical diagnosis. Further, it will be recognized that the same geometric member may be employed in developing models for different medical diagnoses where the event represented by the geometric member is required in the treatment regimen for the different medical diagnoses. For example, a given instrument such as a sphygmomanometer will likely be required in the treatment regimen for many different medical diagnoses. Still further, the universality of securement of the different geometric members to one another and to the platform permits the ready arrangement of the appropriate geometric members in the development of a given model, and for the ready rearrangement of the geometric members within a given model in the event the requirements for a given treatment regimen are altered for any reason or even eliminated.

By reason of the unique and common coloring of each of the geometric members of a grouping thereof, the model presents a striking visual representation of the events that go to make up the treatment regimen which is depicted by the model, thereby making it easy for health care workers to recognize and remember the location of and/or order of occurrence of a given event of the treatment regimen. This feature of the present invention enhances the instruction of health care workers in the timing of and the requirements of their respective contributions to the successful implementation of the treatment regimen depicted by the model. Further, a model constructed in accordance with the present invention is useful in explaining to a patient the course of events which will occur in the course of their treatment during their stay in the health care facility. The relative low cost of the physical embodiment of a model constructed in accordance with the present invention makes it also possible to provide to a patient a model of their treatment regimen for their personal reference during their stay in the health care facility.

Whereas any suitable interconnectable geometric members may be employed in constructing the visual representation of a treatment regimen in accordance with the present invention, it has been found that the elements of the construction toy sold by LEGO Systems, Inc. of Enfield, Conn., under the trademark LEGO, are most suitable so long as the coloring and sizing schemas are maintained.

What is claimed:

1. A method for the visual depiction of a clinical pathway representing the treatment of a clinical condition comprising the steps of:

providing a diagnosis element comprising a structural element having indicia representative of the diagnosis, the diagnosis element being adapted to allow the attachment of other structural elements on a surface thereof;

providing a care event element for each care event associated with the clinical pathway related to the diagnosis, each care event element comprising a structural element having indicia representative of a care event related to the diagnosis, the care event element having at least a top surface and a bottom surface, the bottom surface of the care event element adapted to be attached to the diagnosis element and the top surface of the care event element adapted to allow the attachment of other structural elements thereto;

providing a resource element for each resource to be used in a care event related to the clinical pathway, each resource element comprising a structural element having indicia representative of the resource to be utilized in the clinical pathway, each resource element being adapted to attach to the diagnosis element or a care event element; and identifying each care event in the clinical pathway to be performed relative to the diagnosis;

selecting a care event element to associate with each identified care event;

attaching the selected care event elements to the diagnosis element in an order that the care events will be carried out in the clinical pathway;

identifying resources associated with the performance of each care event;

selecting a resource element to associate with each identified resource; and attaching the selected resource elements proximal to the care event elements with which they are associated; wherein the clinical pathway associated with the diagnosis is represented by the assembly of diagnosis, care event and resource elements.

2. The method of claim 1 wherein the clinical pathway includes a plurality of care events and a plurality of resources, further comprising:

the step of providing a care event element for each care event further comprises providing a number of care event elements equal to the number of care events in the clinical pathway, said indicia representative of a care event on each care event element indicating the association with a particular care event; and the step of providing a resource element for each resource utilized in the clinical pathway further comprises providing a number of resource elements equal to the number of resources identified for use in the clinical pathway, said indicia representative of a resource on each resource element indicating the association with a particular resource.

3. The method of claim 2 wherein the provision of said indicia further comprises providing written indicia.

4. The method of claim 2 wherein the provision of said indicia further comprises providing a color coded indicia.

5. The method of claim 1 wherein at least one of said resource elements is associated with medical supplies.

6. The method of claim 1 wherein at least one of said resource elements is associated with a labor resource.

7. The method of claim 1 wherein at least one of said resource elements is associated with a data resource.

8. The method of claim 1 wherein at least one of said resource elements is associated with a medical facility.

9. The method of claim 1 wherein at least one of said resource elements is associated with an item of durable medical equipment.

10. The method of claim 1 wherein the step of providing of a resource element further comprises the resource element having top and bottom surfaces, the bottom surface adapted to allow attachment of the resource element to the diagnosis element or a care event element and the top surface adapted to allow attachment of other resource elements thereto.

* * * * *